United States Patent
Nakamura et al.

(10) Patent No.: US 9,491,323 B2
(45) Date of Patent: Nov. 8, 2016

(54) INFORMATION PROCESSING APPARATUS, IMAGE FORMING SYSTEM, AND METHOD FOR CONTROLLING AN INFORMATION PROCESSING APPARATUS

(71) Applicant: KYOCERA Document Solutions Inc., Osaka (JP)

(72) Inventors: Hiroshi Nakamura, Osaka (JP); Akihiro Umenaga, Osaka (JP); Rie Kasai, Osaka (JP); Satomi Murai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/832,542

(22) Filed: Aug. 21, 2015

(65) Prior Publication Data

US 2016/0065775 A1 Mar. 3, 2016

(30) Foreign Application Priority Data

Sep. 1, 2014 (JP) .................................. 2014-177212

(51) Int. Cl.
*H04N 1/00* (2006.01)
*G06F 21/10* (2013.01)
*H04N 1/44* (2006.01)

(52) U.S. Cl.
CPC ........ *H04N 1/00938* (2013.01); *G06F 21/105* (2013.01); *H04N 1/0097* (2013.01); *H04N 1/00244* (2013.01); *H04N 1/00973* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 8,321,599 B2 * | 11/2012 | Miyajima | ............. | G06F 21/105 358/1.18 |
| 2007/0220269 A1 * | 9/2007 | Suzuki | ................ | H04N 1/0097 713/182 |
| 2009/0205031 A1 | 8/2009 | Sato et al. | ......................... | 726/7 |
| 2009/0235363 A1 * | 9/2009 | Tomita | .................... | G06F 21/10 726/27 |
| 2012/0210442 A1 * | 8/2012 | Ito | ........................... | G06F 21/10 726/26 |

(Continued)

FOREIGN PATENT DOCUMENTS

| | | |
|---|---|---|
| JP | 2006-202196 A | 8/2006 |
| JP | 2010-165101 A | 7/2010 |

(Continued)

OTHER PUBLICATIONS

Japanese Office Action dated Jun. 13, 2016, issued by the Japanese Patent Office in corresponding application JP 2014-177212.

*Primary Examiner* — Fan Zhang
(74) *Attorney, Agent, or Firm* — Stein IP, LLC

(57) ABSTRACT

An information processing apparatus has: a data communication portion for communicating with a first image forming apparatus holding an authentic prime key within the same local network, and a second image forming apparatus within the same local network; a storage portion for storing a key generation program for issuing an activation key based on the prime key; and a control portion for acquiring the prime key from the first image forming apparatus on receiving an activation request from the second image forming apparatus, generating the activation key for use on the second image forming apparatus, and transmitting the activation key to the second image forming apparatus.

7 Claims, 8 Drawing Sheets

(56) References Cited

U.S. PATENT DOCUMENTS

2013/0111564 A1* 5/2013 Jin .................. H04N 1/4413
            726/4
2013/0133080 A1  5/2013 Yuki .............................. 726/27

FOREIGN PATENT DOCUMENTS

| JP | 2013-190968 A | 9/2013 |
| WO | EP 2 019 364 A2 | 7/2008 |

* cited by examiner

INFORMATION PROCESSING APPARATUS, IMAGE FORMING SYSTEM, AND METHOD FOR CONTROLLING AN INFORMATION PROCESSING APPARATUS

INCORPORATION BY REFERENCE

This application is based upon and claims the benefit of priority from the corresponding Japanese Patent Application No. 2014-177212 filed on Sep. 1, 2014, the entire contents of which are incorporated herein by reference.

BACKGROUND

The present disclosure relates to an information processing apparatus that can manage activation of applications, and to an image forming system including such an information processing apparatus and an image forming apparatus.

Some image forming apparatuses, such as multifunctional peripherals and copiers, allow extra programs (applications) to be added to (installed on) them. It is often the case that simply installing a program on an image forming apparatus does not make it ready for use; a license needs to be obtained by requesting it from a licenser, such as a manufacturer or vendor of the program. Concerning the offering of such licenses, the following technologies are known.

Specifically, a known network system is configured as follows. A user apparatus acquires an application from an application providing system across a network. In the user apparatus is stored installed application list information containing information on the applications acquired by the user apparatus in the past. Based on application list information received from the application providing system and the installed application list information, whether or not an application has already been acquired is checked. If it is found that the application has not been acquired yet, then whether or not a license for the application needs to be obtained is checked.

A manufacturer or vendor of image forming apparatuses itself, or a corporation affiliated with it, or a party in possession of an application development environment for image forming apparatuses can develop and market applications for image forming apparatuses. In fact, various applications for enhancing the functions of image forming apparatuses are developed and marketed. For example, with an automatic scan-and-transmit application, when a document is read, image data is generated at a previously set resolution and in a previously set file format, and the generated image data (file) is transmitted to a previously set address. With a display-oriented application, what is displayed on the screen of an operation panel provided on an image forming apparatus can be changed to suit a user's preferences.

A user who wants to use an application installs it on a storage device such as a HDD incorporated in an image forming apparatus. It often occurs that simply installing the application does not permit the user to use it and the user is requested to activate it.

SUMMARY

According to one aspect of the present disclosure, an information processing apparatus includes a data communication portion, a storage portion, and a control portion. The data communication portion is operable to communicate with a first image forming apparatus that is an image forming apparatus within a local network to which the information processing apparatus belongs and that holds a prime key issued by an external authentic activation key issuing system, and with a second image forming apparatus that is an image forming apparatus within the local network to which the information processing apparatus belongs and that has installed thereon an application which has not yet been activated. The storage portion is operable to store a key generation program for issuing an activation key based on the prime key. The control portion is operable, when the data communication portion receives from the second image forming apparatus an activation request requesting the issuance of the activation key, to make the data communication portion acquire the prime key from the first image forming apparatus; generate, based on the acquired prime key and the key generation program, the activation key for use on the second image forming apparatus that has submitted the activation request; and make the data communication portion transmit the generated activation key to the second image forming apparatus that has submitted the activation request.

Further features and advantages of the present disclosure will become apparent from the description of embodiments given below.

DETAILED DESCRIPTION

The present disclosure enables activation with no connection between an image forming apparatus and an external network. It also provides an information processing apparatus and an image forming system that reduce operation burden and wait time on the part of an activation operator and that reduce burden on the part of an administrator of an activation key issuing system. With reference to FIGS. 1 to 8, an embodiment of the present disclosure will be described. The following description takes up, as an example, an image forming system 100 including an information processing apparatus 1, an image forming apparatus 2A (corresponding to a first image forming apparatus), an image forming apparatus 2B (corresponding to a second image forming apparatus), and an image forming apparatus 2C (corresponding to a second image forming apparatus). All specific features of the embodiment in terms of structure, arrangement, etc. are merely illustrative, and none are meant to limit the scope of the present disclosure.

(Outline of an Image Forming System 100)

Figure 1:
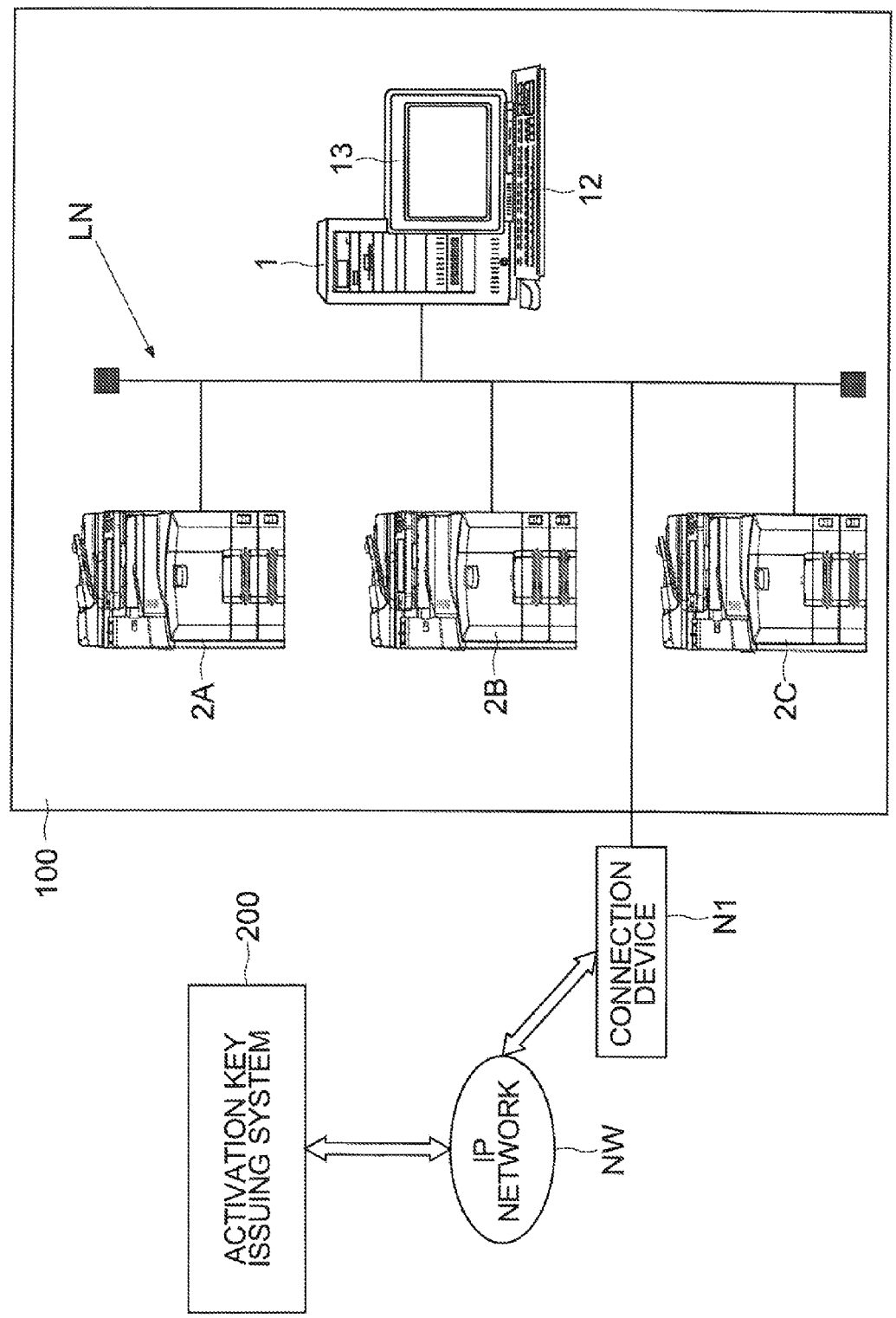
FIG. 1 is a diagram showing an example of an image forming system.

First, with reference to FIG. 1, an example of an image forming system 100 embodying the present disclosure will be described. FIG. 1 is a diagram showing an example of an image forming system 100.

The image forming system 100 includes an information processing apparatus 1 and a plurality of image forming apparatuses (image forming apparatuses 2A, 2B, and 2C). The information processing apparatus 1 is a so-called personal computer. The image forming apparatuses 2A to 2C are so-called multifunctional peripherals provided with a plurality of functions such as a copy function and a scan-and-transmit function.

The following description of the embodiment assumes that the image forming system 100 includes three image forming apparatuses. In practice, the number of image forming apparatuses included in the image forming system 100 can be four or more, but at least two or more. Although the image forming apparatuses 2A to 2C can be different models, the following description assumes that they are the same model.

The information processing apparatus 1 and the image forming apparatuses 2A, 2B, and 2C are connected together so that they can communicate with each other within a local network LN such as Ethernet. In other words, a LAN connects together the information processing apparatus 1 and the image forming apparatuses 2A, 2B, and 2C together so that these can communicate with each other.

The local network LN is connected, via a connection device N1 such as a gateway (or a router), to an external network (in the example shown in FIG. 1, an IP network NW). In other words, the local network LN is on the terminal side of the connection device N1. Via the IP network NW (the Internet), the image forming apparatuses 2A to 2C and the information processing apparatus 1 are connected to an activation key issuing system 200 so that mutual communication is possible among these.

The activation key issuing system 200 is a public server for the management of licenses, and is administered by a developer or vendor of an application Ap or a party related to them. The activation key issuing system 200 receives a request for the issuance of an activation key (prime key K1) for authorizing the use of the application Ap. The activation key issuing system 200 verifies the issuance request. The activation key is a protection canceling key for cancelling a protection set on the application Ap. On confirming that the request meets previously set conditions and is authentic, the activation key issuing system 200 creates the prime key K1 and transmits it to the request submitter. This embodiment deals with an example where activation is possible on only one image forming apparatus by use of only one prime key K1 without the information processing apparatus 1 creating any activation key. Moreover, the prime key can be held on only one image forming apparatus. How the prime key K1 is issued will be described in detail later.

The following description deals with an example where a verified public key (prime key K1) issued by the activation key issuing system 200 is entered on the image forming apparatus 2A. An application Ap installed on the image forming apparatus 2A is activated (authorized to be used) with the prime key K1 as a master key. On the other hand, the same application Ap as that activated on the image forming apparatus 2A is installed on the image forming apparatuses 2B and 2C. The application Ap on the image forming apparatuses 2B and 2C can be activated with a key generated by the information processing apparatus 1 based on the prime key K1 held on the image forming apparatus 2A. Thus, no request for the issuance of a key for activating the application Ap on the image forming apparatuses 2B and 2C needs to be submitted to the activation key issuing system 200.

Thus, the image forming apparatus 2A corresponds to a first image forming apparatus that is an image forming apparatus within a local network LN to which the information processing apparatus 1 belongs and that holds a prime key K1 issued by an external authentic activation key issuing system 200. On the other hand, the image forming apparatuses 2B and 2C correspond to a second image forming apparatus that is an image forming apparatus within the local network LN to which the information processing apparatus 1 belongs and that has installed thereon an application Ap which has not yet been activated.

(Outline of an Image Forming Apparatus)

Figure 2:
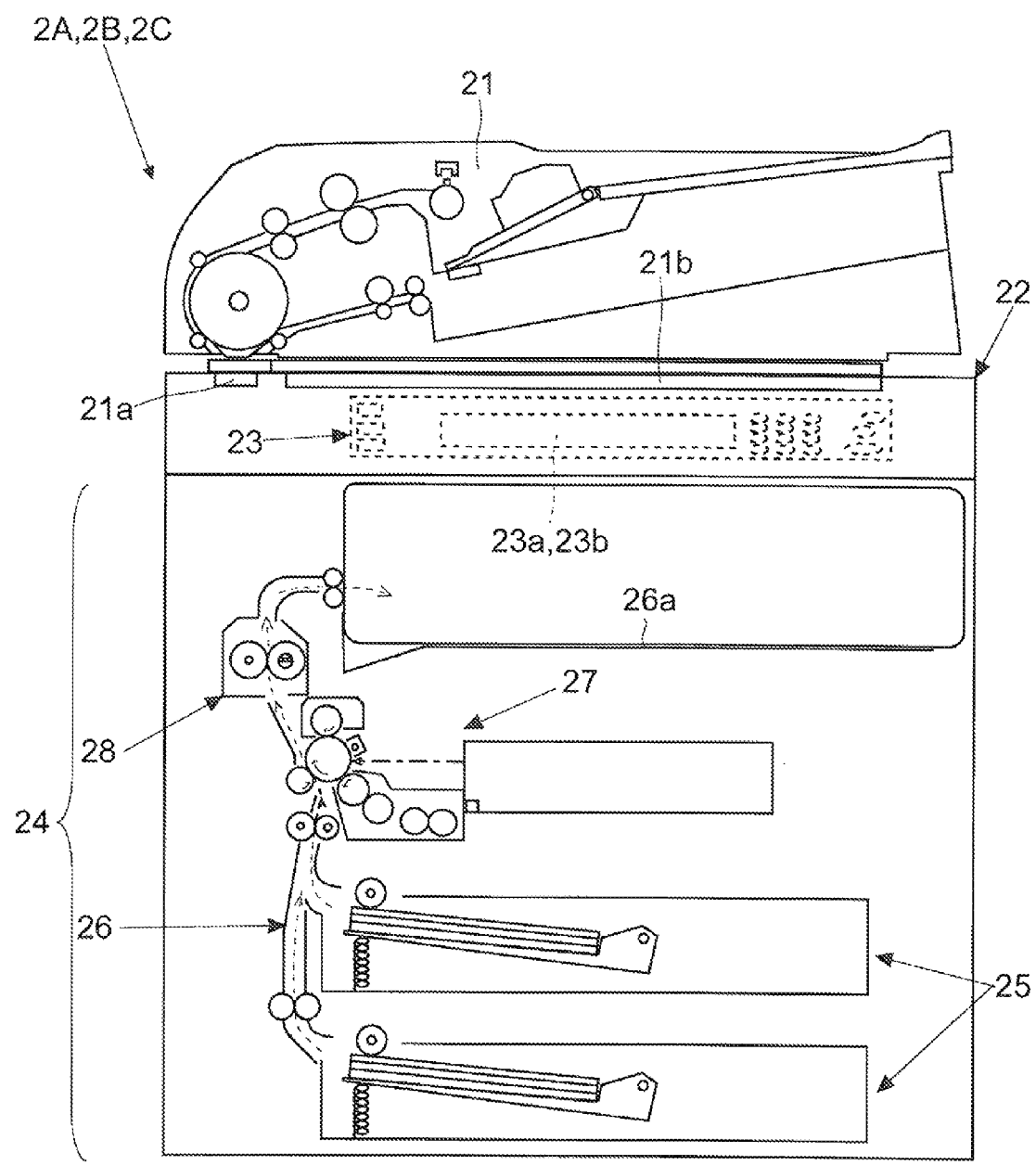
FIG. 2 is a diagram showing an example of an image forming apparatus.

Next, with reference to FIG. 2, an outline of an image forming apparatus embodying the present disclosure will be described. FIG. 2 is a diagram showing one example of the image forming apparatus 2A.

With reference to FIG. 2, the image forming apparatuses 2A, 2B, and 2C will be described. The image forming apparatuses 2A to 2C are the same model, and thus have similar constructions. Accordingly, FIG. 2 shows only one image forming apparatus. In the following description, the components of the image forming apparatuses 2A, 2B, and 2C are identified by common reference signs.

As shown in FIG. 2, in this embodiment, the image forming apparatuses 2A, 2B, and 2C each have, in an upper part thereof, a document transport portion 21 and an image reading portion 22. On a front face of the image forming apparatuses 2A, 2B, and 2C, an operation panel 23 (indicated by broken lines) is provided. Inside the apparatuses 2A, 2B, and 2C, there is provided a printing portion 24 (including a paper feed portion 25, a transport portion 26, an image forming portion 27, and a fusing portion 28) which performs printing.

The operation panel 23 includes a display portion 23a for displaying the status of the image forming apparatus 2A, various messages, and various setting screens. Also displayed here are screens for installing an application Ap on the image forming apparatus 2A and activating it. On a top face of the display portion 23a, a touch panel portion 23b is provided. The touch panel portion 23b is for extracting the coordinates of a position at which the display portion 23a is pressed. Based on the output from the touch panel portion 23b, a pressed button (operated button) is identified.

The document transport portion 21 automatically and sequentially feeds, out of a document set on it, one sheet after another toward a feed-reading contact glass 21a (reading position). The image reading portion 22 reads the document that passes across the document transport portion 21, or a document placed on a stationary-reading contact glass 21b, and generates image data.

The paper feed portion 25 contains a plurality of sheets of a recording medium, and feeds one sheet after another into the transport portion 26. The transport portion 26 transports the sheets fed from the paper feed portion 25. The image forming portion 27 forms a toner image based on the image data, and transfers the toner image to a sheet transported. The fusing portion 28 fuses the toner image transferred to the sheet. After the fusing of toner, the sheet is ejected onto an ejection tray 26a.

(Hardware Configuration of an Image Forming System 100)

Figure 3:
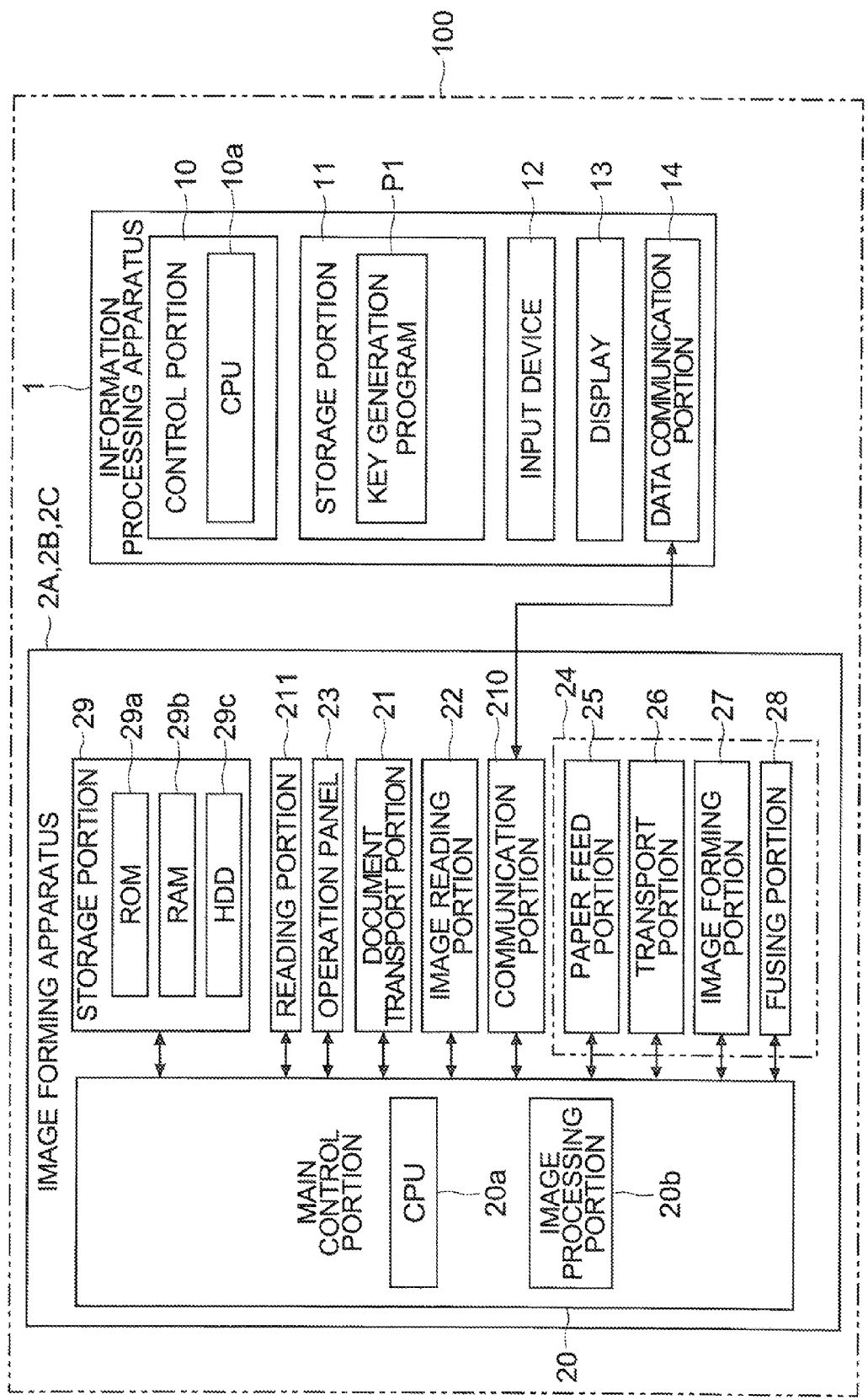
FIG. 3 is a block diagram showing an example of a configuration of an image forming system.

Next, with reference to FIG. 3, an example of a hardware configuration of an image forming system 100 embodying the present disclosure will be described. FIG. 3 is a block diagram showing an example of a configuration of an image forming system 100.

The image forming apparatuses 2A, 2B, and 2C have similar configurations, and accordingly, for convenience' sake, FIG. 3 shows only one image forming apparatus.

The image forming apparatuses 2A, 2B, and 2C include a main control portion 20 and a storage portion 29. The main control portion 20 governs the operation of the image forming apparatus. The main control portion 20 includes a CPU 20a and an image processing portion 20b. The main control portion 20 may be divided into a plurality of control portions having different functions, such as an overall control portion for overall control and for image processing and an engine control portion for image formation and for turning on an off and otherwise controlling motors for rotating various rotatable members.

The CPU 20a is a central processing unit. Based on programs, applications Ap, and data stored in the storage portion 29, the CPU 20a controls different parts of the image forming apparatus and performs various kinds of data processing. The image processing portion 20b performs processing on image data. The image processing portion 20b performs processing such as image processing on image data to achieve density conversion and enlargement and reduction printing, and format conversion on image data read by the image reading portion 22.

The storage portion 29 includes ROM 29a, RAM 29b, and a HDD 29c. The storage portion 29 is composed of a combination of nonvolatile and volatile storage devices. In the storage portion 29 are stored various programs for controlling the image forming apparatus, applications Ap for adding extra functions to the image forming apparatus to make it more useful, and various kinds of data (setting data, image data).

The main control portion 20 is connected, via a bus or signal lines, to the operation panel 23, the document transport portion 21, the image reading portion 22, and the printing portion 24 so as to control different parts and devices, thereby to control the operation (e.g., scanning operation and printing operation) of the image forming apparatus. The main control portion 20 is connected also to a communication portion 210 which includes various connectors, sockets, and communication control chips. The communication portion 210 is connected, via a network, a public network, or a cable, to another image forming apparatus and to the data communication portion 14 of the information processing apparatus 1 so that mutual communication is possible among these. The communication portion 210 can exchange various kinds of data with another image forming apparatus and with the information processing apparatus 1.

Next, the information processing apparatus 1 will be described. The information processing apparatus 1 includes a control portion 10 (main control circuit board) provided with a CPU 10a, a storage portion 11 comprising a HDD, RAM, and ROM. an input device 12 (corresponding to an accepting portion) such as a keyboard and a mouse, a display 13 as a display device, and a data communication portion 14 as an interface for communication with the outside.

The control portion 10 is a circuit board on which circuits and chips, such as the CPU 10a, are mounted. The control portion 10 performs processing for calculation and control in the information processing apparatus 1. The storage portion 11 stores programs and data for operating and using the information processing apparatus 1. The storage portion 11 stores, in particular, a key generation program P1 for generating (issuing), based on a prime key K1, a key for activating an application Ap. The key generation program P1 is distributed by the developer or vendor of the application Ap. The key generation program P1 is installed in the storage portion 11 of the information processing apparatus 1 by downloading via the data communication portion 14. In a case where the key generation program P1 is distributed on a recording medium such as a CD or DVD, the key generation program P1 can be installed in the storage portion 11 of the information processing apparatus 1 by being read from the recording medium by a reading device (unillustrated) provided in the information processing apparatus 1.

(Activation on a 1st Apparatus within a Local Network LN)

Figure 4:
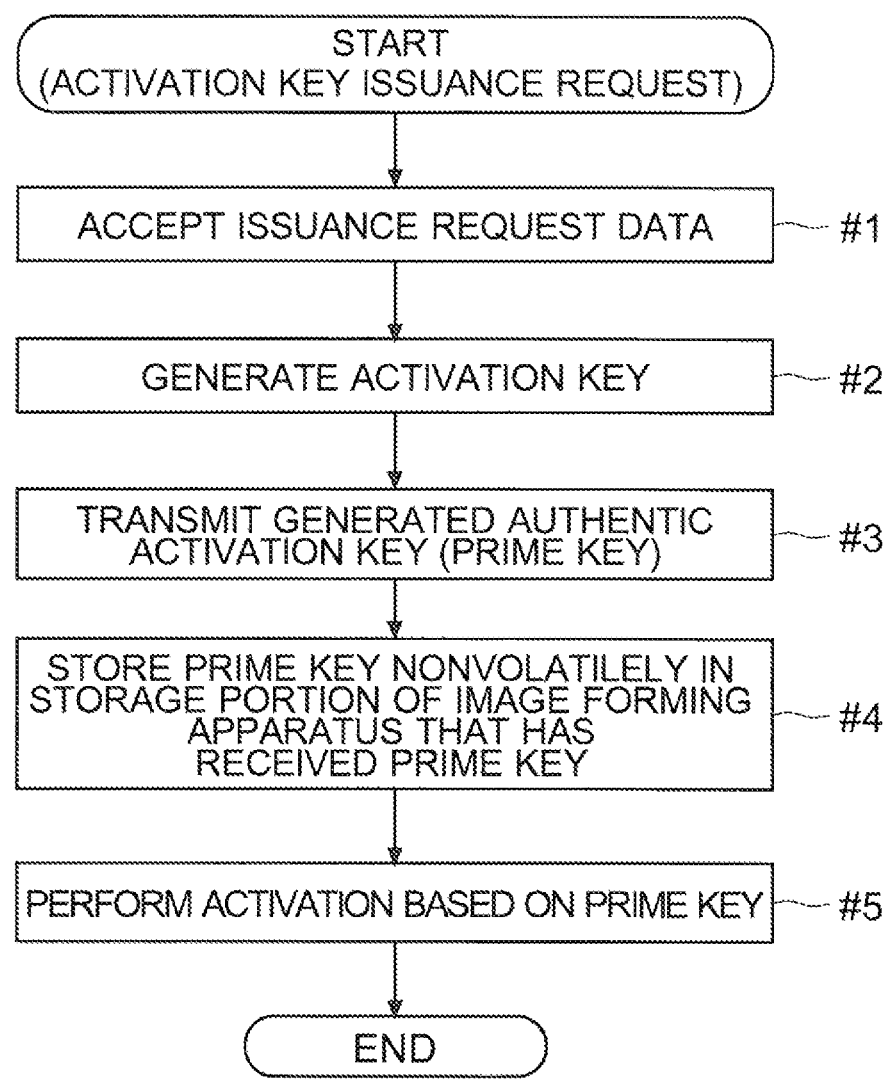
FIG. 4 is a flow chart showing an example of a procedure for activation on a first image forming apparatus in an image forming system.
Figure 5:
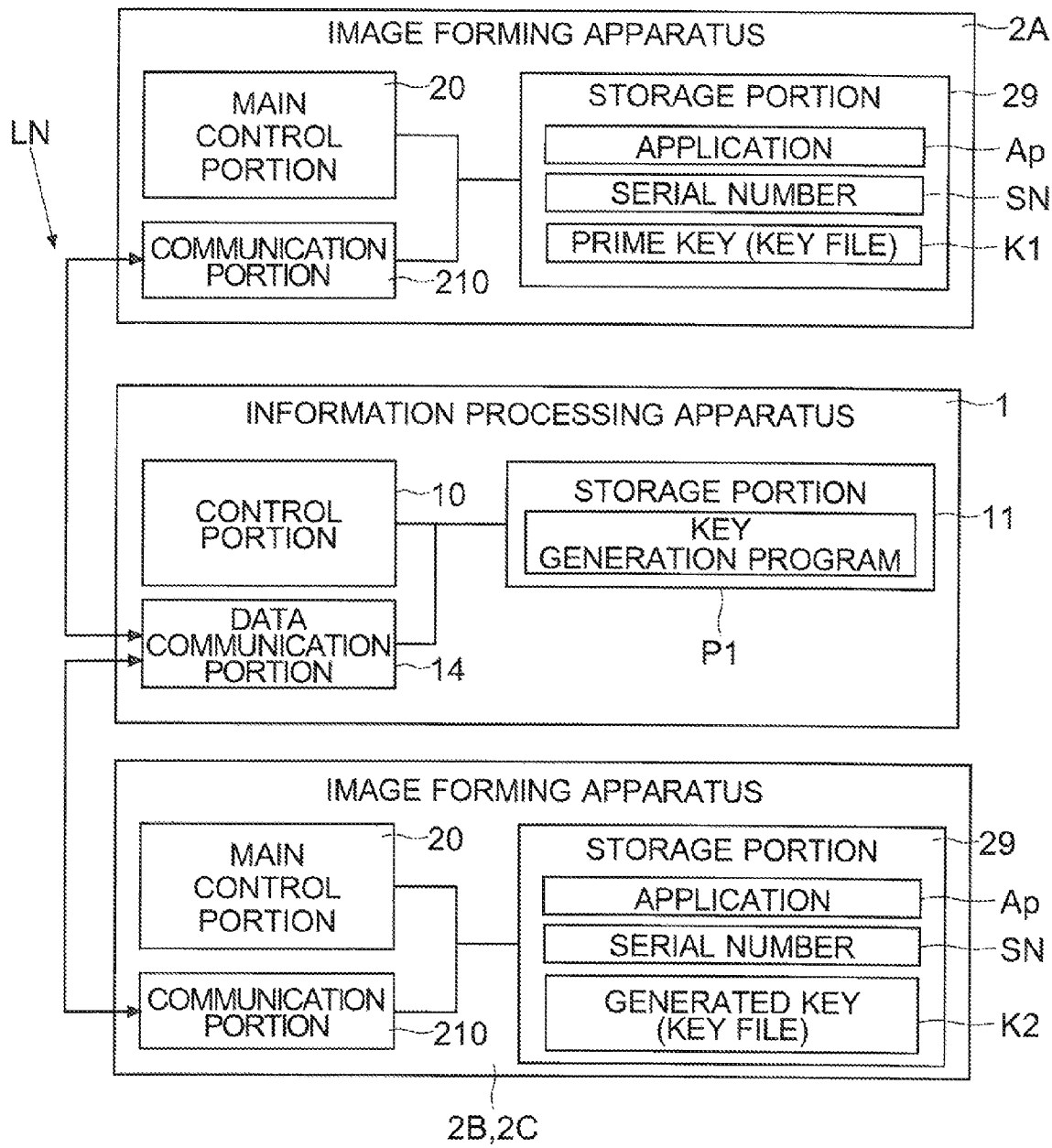
FIG. 5 is a diagram showing an example of an image forming system.

Next, with reference to FIGS. 4 and 5, a description will be given of an example of a procedure for activation on a first image forming apparatus (the activation of an application installed on the first image forming apparatus) in an image forming system 100 embodying the present disclosure. FIG. 4 is a flow chart showing an example of a procedure for activation on a first image forming apparatus in an image forming system 100. FIG. 5 is a diagram showing one example of the image forming system 100.

The same application Ap can be installed on each of the image forming apparatuses 2A to 2C. The application Ap can be installed on the image forming apparatuses 2A to 2C by accessing a server that stores the application Ap and downloading it across the IP network NW. Instead, the application Ap may be stored on a portable storage medium such as a USB memory so that the application Ap can be installed in the storage portion 29 by acquiring (downloading) the application Ap from the portable storage medium inserted in a reading portion 211 (see FIG. 3) which is an interface provided in an image forming apparatus and which includes a socket and a communication IC.

However, in the image forming system 100, simply downloading the application Ap does not make it ready for use. To make the application Ap ready for use, it needs to be activated on the image forming apparatuses 2A to 2C.

In the image forming system 100, when the same application Ap is installed on a plurality of image forming apparatuses, activation on the first image forming apparatus is performed by use of a public activation key (prime key K1) issued by an activation key issuing system 200 provided outside.

The flow of FIG. 4 starts when a person in charge of activation submits to the activation key issuing system 200 a request for the issuance of the activation key (prime key K1). The data of the request for the issuance of the prime key K1 is transmitted from the image forming apparatus 2A on which the application Ap is going to be activated for the first time in the image forming system 100. In this case, a user enters information necessary for the request by operating the operation panel 23 and the touch panel portion 23b of the image forming apparatus 2A. The communication portion 210 of the image forming apparatus 2A then transmits the entered information via an IP network NW or the like to the activation key issuing system 200 outside the local network LN.

The data of the request for the issuance of the activation key may instead be transmitted from the information processing apparatus 1. In this case, an operator in charge enters information necessary for the request on the information processing apparatus 1, and the information processing apparatus 1 accepts the information entered on the input device 12. The data communication portion 14 of the information processing apparatus 1 then transmits the entered information via an IP network NW or the like to the activation key issuing system 200 outside the local network LN. In this way, a request for an activation key for use on the first image forming apparatus (image forming apparatus 2A) can be sent from the information processing apparatus 1.

The data of the request for the issuance of an activation key can contain the kind of the application Ap for which the issuance of the activation key is requested, an application ID embedded in the application Ap, a serial number SN (manufacturing number) of the image forming apparatus 2A, and information on the configuration of the image forming apparatus (information on circuits, members, optional units attached, etc.). The request data may contain other information.

In this example, the same application Ap is assigned the same application ID. Instead, individual applications Aps may be assigned unique application IDs. Moreover, the image forming apparatuses 2A to 2C each have a serial number SN stored on a nonvolatile basis in the storage portion 29 (see FIG. 5). The image forming apparatuses 2A to 2C are assigned unique serial numbers SN. Moreover, the activation key issuing system 200 stores the received request data on a nonvolatile basis.

As described above, the activation key issuing system 200 accepts the data of the request for the issuance of an activation key (prime key K1) (step #1). Using the serial number SN of the image forming apparatus 2A contained in the request data, the activation key issuing system 200 then generates the activation key (step #2). The activation key issuing system 200 holds conditions for recognizing illegal requests. The activation key issuing system 200 can be configured to generate no activation key in response to an illegal request, or can be configured to generate no activation key when the request data is abnormal.

An activation key is generated in the form of a file (key file). The activation key (key file) contains, as well as a key itself (a key for canceling protection; an alphanumeric character string), a signature indicating that the key is authentic, and information on dates and times such as the date and time of the generation of the activation key and, in a case where the license of the application Ap has a limited term, the date of its expiry.

The activation key issuing system 200 includes a processing circuit such as a CPU, which generates, according to a previously set processing formula, an activation key (a key itself, a cancellation key) that can be used only on the image forming apparatus 2A. Since each image forming apparatus is assigned a unique serial number, the generated activation key (a key itself, a cancellation key) differs from one image forming apparatus to another.

The activation key issuing system 200 then transmits the generated authentic activation key (prime key K1, key file) to the communication portion 210 of the image forming apparatus 2A (step #3). The main control portion 20 of the image forming apparatus 2A stores the prime key K1 received via the communication portion 210 in the storage portion 29 of the image forming apparatus 2A on a nonvolatile basis (step #4).

Based on the received prime key K1 (master activation key), the main control portion 20 of the image forming apparatus 2A activates the corresponding application Ap (step #5). Now, the application Ap installed on the image forming apparatus 2A is ready for use ("END").

(Activation on a 2nd and Following Apparatuses within a Local Network LN)

Figure 6:
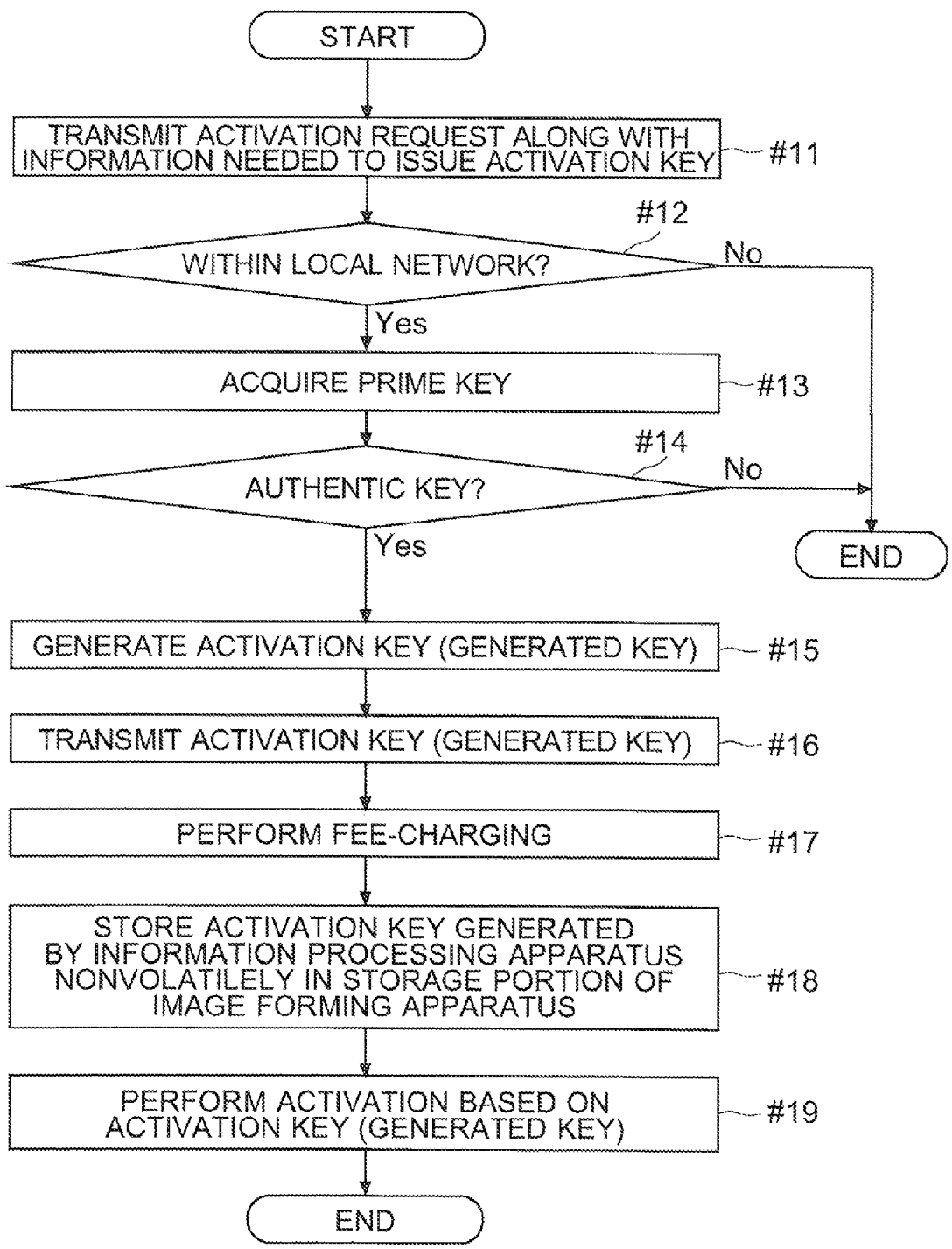
FIG. 6 is a flow chart showing an example of a procedure for activation on a second or any following image forming apparatus in an image forming system.
Figure 7:
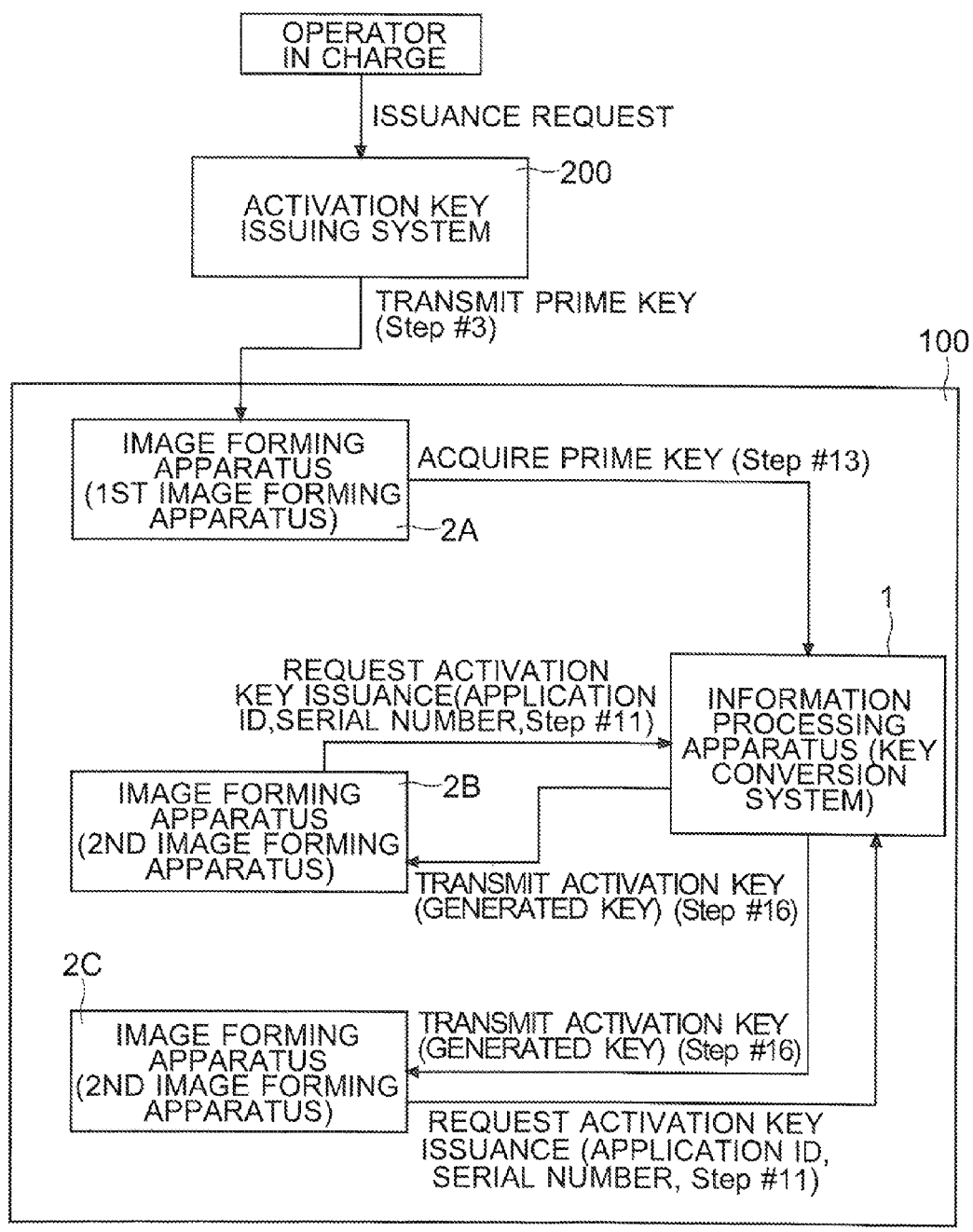
FIG. 7 is a diagram showing an example of a procedure for activation on a second or any following image forming apparatus in an image forming system.

Next, with reference to FIGS. 5 to 7, a description will be given of activation on a second or any following image forming apparatus in the local network LN. FIG. 6 is a flow chart showing an example of a procedure for activation on a second or any following image forming apparatus in the image forming system 100. FIG. 7 is a diagram illustrating an example of a procedure for activation on a second or any following image forming apparatus in the image forming system 100.

Here, it is assumed that, as mentioned above with reference to FIGS. 4 and 5, the same application Ap is installed on the image forming apparatuses 2A, 2B, and 2C in the image forming system 100, and that a prime key K1 issued by the activation key issuing system 200 is held and stored in the storage portion 29 of the image forming apparatus 2A.

The following description deals with an example where activation is performed on the image forming apparatus 2B out of the image forming apparatuses 2B and 2C on which the application Ap has not yet been activated. Incidentally, on the image forming apparatus 2C, the application Ap can be activated through a similar procedure as on the image forming apparatus 2B.

The flow of FIG. 6 starts when an instruction to perform activation (an activation request) based on the prime key K1 on the image forming apparatus 2A is entered on the operation panel 23 of the image forming apparatus 2B. In other words, it starts when the activation of the application Ap is triggered. When the touch panel portion 23b is operated in a predetermined manner, the main control portion 20 of the image forming apparatus 2B displays on the operation panel 23 (display portion 23a) a screen for activating the application Ap. Based on the operation performed on the screen, the main control portion 20 of the image forming apparatus 2B accepts a request for the activation of the application Ap.

The main control portion 20 of the image forming apparatus 2B makes the communication portion 210 transmit to the data communication portion 14 of the information processing apparatus 1 a request for the activation of the application Ap along with information necessary to for the issuance of an activation key (step #11). The main control portion 20 of the image forming apparatus 2B makes the communication portion 210 transmit to the data communication portion 14 of the information processing apparatus 1 information such as an application ID of the application Ap to be activated and a serial number SN of the image forming apparatus 2B.

The data communication portion 14 of the information processing apparatus 1 then acquires (receives), from the image forming apparatus 2B (a second image forming apparatus) that has issued the activation request, information indicating the serial number SN and the application Ap (application ID) to be activated.

Subsequently, the control portion 10 of the information processing apparatus 1 checks whether or not the image forming apparatus 2B that has issued the activation request is within the local network LN (step #12). In the storage portion 11 of the information processing apparatus 1 are stored conditions, such as a range of network addresses to be identified as belonging to the same local network LN, for determining whether or not an apparatus is within the same local network LN. By checking the address of the image forming apparatus that has issued the activation request against those conditions, the control portion 10 of the information processing apparatus 1 checks whether or not the image forming apparatus 2B is within the same local network LN.

If the image forming apparatus 2B is not connected to the same local network LN (if it is not a second image forming apparatus; step #12, "No"), the flow ends ("END"). Thus, in response to an activation request from an image forming apparatus that is not connected to the same local network LN but belongs to an external network, the control portion 10 of the information processing apparatus 1 issues no activation key based on the prime key K1. That is, even when the data communication portion 14 receives an activation request from an image forming apparatus outside the local network LN to which the information processing apparatus 1 itself belongs, the control portion 10 generates no activation key based on the prime key K1 and the key generation program P1.

On the other hand, if the image forming apparatus 2B is connected to the same local network LN (if it is a second image forming apparatus; step #12, "Yes"), the information processing apparatus 1 acquires the prime key K1 held in the storage portion 29 of the image forming apparatus 2A (step #13). In other words, when the data communication portion 14 receives an activation request for the issuance of an activation key from a second image forming apparatus (the image forming apparatus 2B), the control portion 10 of the information processing apparatus 1 makes the data communication portion 14 transmit to a first image forming apparatus (the image forming apparatus 2A) an instruction to transmit the prime key K1. In response, the communication portion 210 of the first image forming apparatus transmits the prime key K1 to the data communication portion 14 of the information processing apparatus 1.

When the image forming apparatus 2A receives and stores the issued prime key K1, the main control portion 20 of the image forming apparatus 2A makes the communication portion 210 transmit to the data communication portion 14 of the information processing apparatus 1 a notification to the effect that the prime key K1 is held on the image forming apparatus 2A. The storage portion 11 of the information processing apparatus 1 stores the notification. Based on what is stored in the storage portion 11, the control portion 10 of the information processing apparatus 1 then makes the data communication portion 14 transmit to the communication portion 210 of the image forming apparatus 2A an instruction to transmit the prime key K1 (key file).

Instead, in response to an activation request, the information processing apparatus 1 may perform multicasting. In that case, the control portion 10 of the information processing apparatus 1 makes the data communication portion 14 transmit to a plurality of devices within the LAN (the communication portions 210 of the image forming apparatuses 2A to 2C) a request to transmit the prime key K1 to the information processing apparatus 1. Then the image forming apparatus that holds the prime key K1 (in this embodiment, the image forming apparatus 2A) can return the prime key K1 to the information processing apparatus 1.

The control portion 10 of the information processing apparatus 1 checks the prime key K1 (key file). The control portion 10 checks whether or not it is a key from the activation key issuing system 200 (whether or not it is an authentic key) (step #14). Specifically, the control portion 10 of the information processing apparatus 1 checks whether or not the prime key K1 contains a signature verifying the generation of an authentic key.

The information processing apparatus 1 has installed on it a key generation program P1 for performing calculation similar to that performed by the activation key issuing system 200 based on an serial number SN (see FIG. 5). Thus the control portion 10 of the information processing apparatus 1 also acquires the serial number SN of the image forming apparatus 2A, and based on the serial number SN, the key generation program P1 performs calculation according to a previously set calculation formula. The control portion 10 may further generates a key itself (a cancellation key) comprising an alphanumeric character string and checks whether or not the prime key K1 is authentic according to whether or not the generated key matches the received prime key K1 (a key itself, a cancellation key). If a key is one to be distributed to an image forming apparatus other than the image forming apparatus 2A, the control portion 10 of the information processing apparatus 1 finds it unauthentic.

If the prime key K1 is not authentic (step #14, "No"), the application Ap on the image forming apparatus 2B should not be activated. Thus, no activation is performed, and the procedure (flow) ends ("END"). In this case, none of the image forming apparatuses within the local network LN has the prime key K1 received from the activation key issuing system 200, and accordingly the main control portion 20 of the image forming apparatus 2B can display on the display portion 23a a notification to the effect that the issuance of a prime key K1 should be requested.

On the other hand, if the prime key K1 is authentic, based on the key generation program P1 stored in the storage portion 11 (see FIG. 5), the control portion 10 of the information processing apparatus 1 generates an activation key (generated key K2) for the image forming apparatus 2B (step #15). Based on the key generation program P1, the control portion 10 of the information processing apparatus 1 generates, according to a previously set calculation formula, an activation key (a key itself, a cancellation key) that can be used only on the image forming apparatus 2B. Moreover, the control portion 10 of the information processing apparatus 1 generates the activation key for the image forming apparatus 2B in the form of a file. The activation key (generated key K2, key file) for the image forming apparatus 2B contains, as well as the generated key itself (the cancellation key), the date and time of its generation, an indication to the effect that the activation key was generated by the information processing apparatus 1, data on the information processing apparatus 1 that generated it, etc. That is, based on the acquired prime key K1 and the key generation program P1, the information processing apparatus 1 generates an activation key (the generated key K2) to be used on a second image forming apparatus (the image forming apparatus 2B) that has issued the activation request.

Incidentally, the information processing apparatus 1 (the control portion 10) generates no activation key for another image forming apparatus based on the activation key (an activation key other than the prime key, a generated key K2) for the image forming apparatus 2B (a second image forming apparatus). This prevents unrestricted activation.

The control portion 10 of the information processing apparatus 1 then makes the data communication portion 14 transmit the generated activation key (generated key K2) to the communication portion 210 of the image forming apparatus 2B that has issued the activation request (step #16). Furthermore, on generating an activation key for, and transmitting it to, an image forming apparatus other than the image forming apparatus holding the prime key K1, the control portion 10 of the information processing apparatus 1 performs fee-charging operation (step #17). Specifically, it leaves a fee-charging record. The fee-charging record can contain data indicating the application Ap of which the protection is cancelled with the activation key (generated key K2), the image forming apparatus for which the activation key was issued based on the prime key, and the date and time of its issuance.

Each time the control portion 10 of the information processing apparatus 1 generates and transmits an activation key (generated key K2), it makes the storage portion 11 of the information processing apparatus 1 store a fee-charging record. Each time the control portion 10 of the information processing apparatus 1 generates and transmits an activation key (generated key K2), it may also make the data communication portion 14 transmit a fee-charging record to a previously set address (e.g., the activation key issuing system 200 or a server for the management of fee-charging).

By referring to what is stored in the storage portion 11 of the information processing apparatus 1, or by referring to the device at the previously set address (the destination of the transmission of fee-charging records), it is possible to grasp the number of image forming apparatuses on which activation has been performed (the number of licenses), the dates and times on and at which activation was performed, etc.

The main control portion 20 of the image forming apparatus 2B makes the storage portion 29 of the image forming apparatus 2B store, on a nonvolatile basis, the activation key (generated key K2) received by the communication portion 210 of the image forming apparatus 2B and generated by the information processing apparatus 1 (step #18). Based on the received activation key (a sub activation key), the main control portion 20 of the image forming apparatus 2B activates the corresponding application Ap (step #19). This makes the application Ap installed on the image forming apparatus 2B ready for use ("END").

(Switching the Image Forming Apparatus Holding the Prime Key K1)

Figure 8:
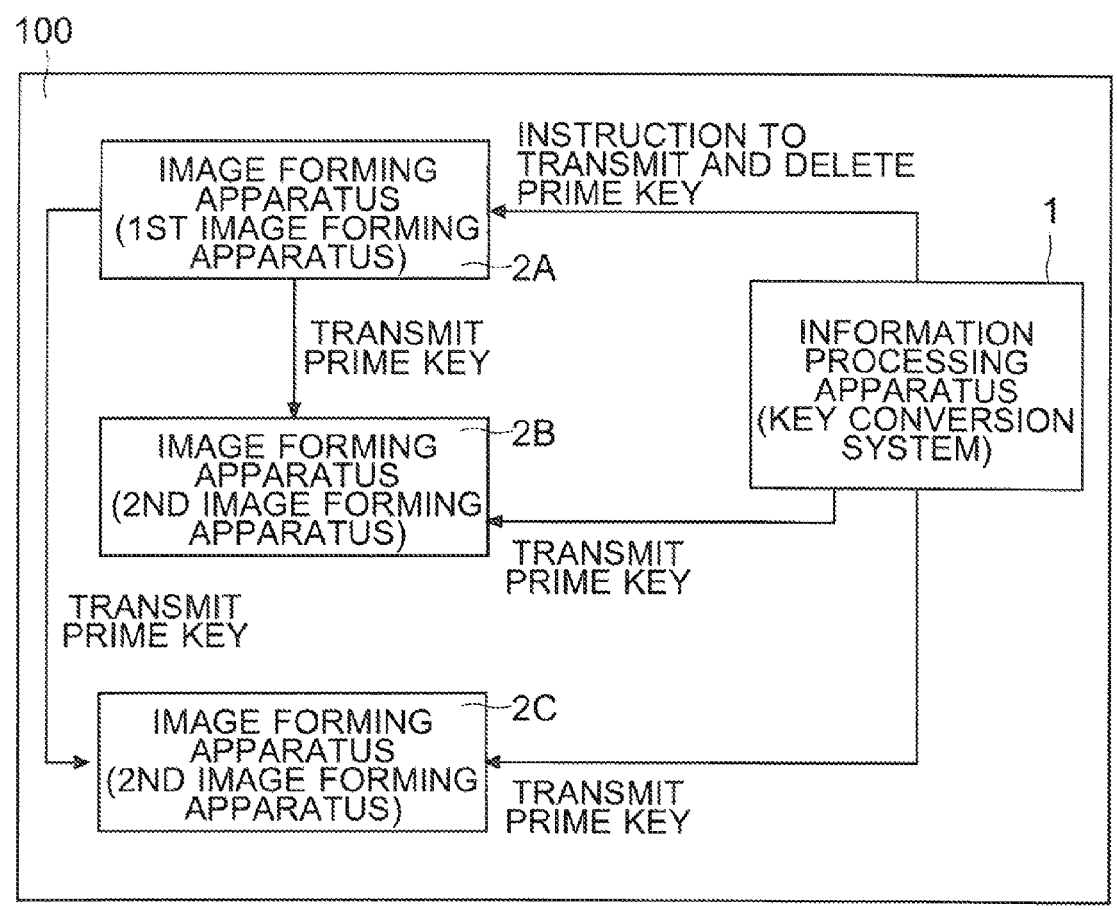
FIG. 8 is a diagram illustrating delegation of a prime key.

Next, with reference to FIG. 8, a description will be given of how the image forming apparatus holding the prime key K1 is switched (how the holding of the prime key K1 is delegated to another image forming apparatus). FIG. 8 is a diagram illustrating delegation of the prime key K1.

The above description deals with an example where, out of the image forming apparatuses connected to the local network LN, the image forming apparatus 2A holds the prime key K1. The image forming apparatus 2A may be replaced for reasons of new purchase or breakdown. Also, the image forming apparatus 2A may be moved to another floor, section, or site, or the local network LN may be reconfigured with the result that the image forming apparatus 2A comes to be operated in a different local network LN. In such cases, the image forming apparatus 2A is removed from the existing local network LN, and it then becomes impossible to issue an activation key (generated key K2) for the other image forming apparatuses 2B and 2C based on the prime key K1 held on the image forming apparatus 2A.

To avoid that, in the information processing apparatus 1 and the image forming system 100 according to this embodiment, the holding of the prime key K1 can be delegated from one image forming apparatus to another (in the example shown in FIG. 8, either image forming apparatus 2B or 2C).

In this case, the information processing apparatus 1 accepts an instruction to switch the image forming apparatus that holds the prime key K1 (to delegate the holding of the prime key K1 to another image forming apparatus) along with a specification of a delegation destination. In other words, the input device 12 (corresponding to an accepting portion) of the information processing apparatus 1 accepts an instruction to switch the first image forming apparatus that holds the prime key K1 along with a specification of the destination (the image forming apparatus 2B or 2C) to which to delegate the prime key K1. A configuration is also possible where a switch instruction and a delegation destination specification can be entered on the operation panel 23 of one of the image forming apparatuses (image forming apparatuses 2A to 2C) belonging to the local network LN. In this case, a notification to the effect that a switch instruction has been entered and the specified destination of the delegation of the prime key K1 are transmitted from the communication portion 210 of the image forming apparatus to the data communication portion 14 of the information processing apparatus 1.

The control portion 10 of the information processing apparatus 1 recognizes the switch instruction and the specified delegation destination. The control portion 10 of the information processing apparatus 1 then makes the data communication portion 14 transmit to the communication portion 210 of the image forming apparatus (the image forming apparatus 2A) holding the prime key K1 an instruction to transmit the prime key K1 (key file) to the specified delegation destination. On receiving the transmission instruction, the main control portion 20 of the image forming apparatus 2A makes the communication portion 210 transmit the prime key K1 to the specified image forming apparatus (the image forming apparatus 2B or 2C).

Instead, the control portion 10 of the information processing apparatus 1 makes the data communication portion 14 transmit to the communication portion 210 of the image forming apparatus (image forming apparatus 2A) holding the prime key K1, first, an instruction to transmit the prime key K1 to the information processing apparatus 1. In this case, the communication portion 210 of the image forming apparatus 2A transmits the prime key K1 to the data communication portion 14 of the information processing apparatus 1. The control portion 10 of the information processing apparatus 1 makes the data communication portion 14 transfer the received prime key K1 (key file) to the communication portion 210 of the image forming apparatus (image forming apparatus 2B or 2C) of the specified delegation destination.

In the example shown in FIG. 8, a configuration is adopted where the prime key K1 is transmitted to the image forming apparatuses 2B and 2C; here, however, the prime key K1 is delegated to only one of a plurality of image forming apparatuses like the image forming apparatuses 2B and 2C (one image forming apparatus is selected for the holding of the prime key K1).

Moreover, the control portion 10 of the information processing apparatus 1 makes the data communication portion 14 transmit to the image forming apparatus (image forming apparatus 2A) that has been holding the prime key K1 an instruction to delete the prime key K1 (erase its data) from the storage portion 29. On receiving the instruction, the control portion 10 of the image forming apparatus 2A erases the prime key K1 (key file) from the storage portion 29. In this way, the control portion 10 of the information processing apparatus 1 deletes the prime key K1 that has been held in the image forming apparatus (image forming apparatus 2A) of the source of the delegation of the prime key K1.

As described above, an information processing apparatus 1 embodying the present disclosure includes a data communication portion 14, a storage portion 11, and a control portion 10. The data communication portion 14 is operable to communicate with a first image forming apparatus that is an image forming apparatus within a local network LN to which the information processing apparatus 1 belongs and that holds a prime key K1 issued by an external authentic activation key issuing system 200, and with a second image forming apparatus that is an image forming apparatus within the local network LN to which the information processing apparatus 1 belongs and that has installed thereon an application Ap which has not yet been activated. The storage portion 11 is operable to store a key generation program P1 for issuing an activation key based on the prime key K1. The control portion 10 is operable, when the data communication portion 14 receives from the second image forming apparatus an activation request requesting the issuance of the activation key, to make the data communication portion 14 acquire the prime key K1 from the first image forming apparatus; generate, based on the acquired prime key K1 and the key generation program P1, the activation key (generated key K2) for use on the second image forming apparatus that has submitted the activation request; and make the data communication portion 14 transmit the generated activation key (generated key K2) to the second image forming apparatus that has submitted the activation request.

In this way, based on the first, single prime key K1, it is possible to generate and issue activation keys for use on other image forming apparatuses belonging to the same local network LN. Thus, when activation is performed on a second or any following image forming apparatus within the same local network LN, there is no need to submit a request to issue an activation key to the activation key issuing system 200 (license management server) belonging to an external network. This helps reduce burden on the activation key issuing system 200 in verifying or otherwise handling such requests.

Thus, when the same application Ap is activated on a plurality of image forming apparatuses, if the information processing apparatus 1 and the image forming apparatuses belong to the same local network LN, the information processing apparatus 1 can issue an activation key (generated key K2). This helps reduce the time and trouble for activation. In addition, the information processing apparatus 1 can issue an activation key for an image forming apparatus only if the information processing apparatus 1, the image forming apparatus holding the prime key K1, and the information processing apparatus on which activation is going to be performed are within the same local network LN. This prevents unrestricted generation of activation keys Moreover, in the local network LN, such as an in-house network, the information processing apparatus 1, the first image forming apparatus, and the second image forming apparatus have only to be able to communicate with each other; that is, there is no need to prepare, for the second image forming apparatus, an environment connectable with an external network such as the Internet. Even when the communication path to the external activation key issuing system 200 is broken, so long as the information processing apparatus 1 and an image forming apparatus can communicate with each other, activation is possible. In terms of information security, the absence of a need for connection with an external network helps reduce the risk of information leakage. Furthermore, compared with a configuration where each image forming apparatus requests the external activation key issuing system 200 to issue an activation key, the activation key issuing system 200 is less likely to receive heavy access. This helps reduce burden on the administrator of the activation key issuing system 200 in terms of equipment investment.

The control portion 10 is operable, when the data communication portion 14 receives the activation request from an image forming apparatus outside the local network LN to which the information processing apparatus 1 belongs, to generate no activation key based on the prime key K1 and the key generation program P1. This helps prevent unrestricted issuance of activation keys based on the single prime key.

The control portion 10 is operable, when the control portion 10 generates the activation key (generated key K2) based on the prime key K1 and the key generation program P1, either or both to make the storage portion 11 store a fee-charging record, and/or to make the data communication portion 14 transmit a fee-charging record to a previously set address.

Thus, by referring to fee-charging records (e.g., information comprising records of activation on an image forming apparatus, such as activation dates and times and applications Ap activated) stored in or transmitted from the storage portion 11, it is possible to easily grasp the number of activation keys issued based on the prime key K1. Thus, based on the number of activation keys issued (the number of applications in use after installation), it is possible to charge customers for fees.

When the image forming apparatus that holds the prime key K1 breaks down or is replaced, it becomes impossible to issue an activation key for an image forming apparatus within the same local network LN. To cope with that, the information processing apparatus 1 further includes an accepting portion (input device 12) operable to accept an instruction to switch the first image forming apparatus that holds the prime key K1 to another image forming apparatus. The control portion 10 is operable, when the accepting portion accepts the instruction to switch the first image forming apparatus that holds the prime key K1, to make the data communication portion 14 transmit the prime key K1 to an image forming apparatus that will newly be made to hold the prime key K1, or make the first image forming apparatus that currently holds the prime key K1 transmit the prime key K1 to an image forming apparatus that will newly be made to hold the prime key K1, and make the data communication portion 14 transmit to the first image forming apparatus that currently holds the prime key K1 an instruction to delete the prime key K1 held there.

Thus, when the image forming apparatus that holds the prime key K1 is removed from the local network LN due to breakdown, replacement, or relocation, it is possible to switch the image forming apparatus holding the prime key K1. Thus, it is possible to maintain the state where, with no new connection to, or acquisition of the prime key K1 from, the activation key issuing system 200 (license management server) belonging to an external network, an activation key (generated key K2) can be issued for an image forming apparatus belonging to the same local network LN.

The data communication portion 14 is operable to acquire from the second image forming apparatus that has submitted the activation request a serial number SN of the second image forming apparatus, and the control portion 10 is operable to generate, by using the acquired serial number SN and according to a previously set calculation formula, the activation key for use on the second image forming apparatus that has submitted the activation request. Thus, it is possible to assign different image forming apparatuses unique activation keys.

According to another aspect of the present disclosure, an image forming system includes an information processing apparatus 1 as described above; a first image forming apparatus that is an image forming apparatus within a local network LN to which the information processing apparatus 1 belongs and that holds a prime key K1 received from an external authentic activation key issuing system 200; and a second image forming apparatus that is an image forming apparatus within the local network LN to which the information processing apparatus 1 belongs and that has installed thereon an application Ap which has not yet been activated. With this configuration, it is possible to provide an image forming system that brings the same effects as the information processing apparatus 1 described above.

The present disclosure can be taken as disclosing a method for controlling an information processing apparatus.

An embodiment of the present disclosure has been described above. The scope of the present disclosure, however, is not limited by the embodiment. The present disclosure may be implemented with any modifications made without departing from its spirit.

What is claimed is:

1. An information processing apparatus comprising:
   a data communication portion operable to communicate with
      a first image forming apparatus
         that is an image forming apparatus within a local network to which the information processing apparatus belongs and
         that holds a prime key issued by an external authentic activation key issuing system and
      a second image forming apparatus
         that is an image forming apparatus within the local network to which the information processing apparatus belongs and
         that has installed thereon an application which has not yet been activated;
   a storage portion operable to store a key generation program for issuing an activation key based on the prime key; and
   a control portion operable, when the data communication portion receives from the second image forming apparatus an activation request requesting issuance of the activation key, to
      make the data communication portion acquire the prime key from the first image forming apparatus,
      check, based on a signature that is included in the acquired prime key and that indicates that the key has been generated authentically, whether or not the acquired prime key is an authentic key provided from the activation key issuing system, and if so,
      generate, based on the acquired prime key and the key generation program, the activation key for use on the second image forming apparatus that has submitted the activation request, the activation key being a file containing the key itself, a date and time of generation thereof, data indicating that the activation key was generated by the information processing apparatus, and data indicating the information processing apparatus that generated the activation key,
      make the data communication portion transmit the generated activation key to the second image forming apparatus that has submitted the activation request, and,
      on generating the activation key based on the prime key and the key generation program, either or both
         make the storage portion store an application of which protection is to be cancelled, the image forming apparatus for which the activation key was issued based on the prime key, and a fee-charging record including a date and time of issuance of the activation key, and/or
         make the data communication portion transmit the fee-charging record to a previously set address.

2. The information processing apparatus of claim 1, wherein
   the control portion is operable, when the data communication portion receives the activation request from an image forming apparatus outside the local network to which the information processing apparatus belongs, to generate no activation key based on the prime key and the key generation program.

3. The information processing apparatus of claim 1, further comprising:
   an accepting portion operable to accept an instruction to switch the first image forming apparatus that holds the prime key to another image forming apparatus, wherein
   the control portion is operable, when the accepting portion accepts the instruction to switch the first image forming apparatus that holds the prime key, to
      make the data communication portion transmit the prime key to an image forming apparatus that will newly be made to hold the prime key or
      make the first image forming apparatus that currently holds the prime key transmit the prime key to an image forming apparatus that will newly be made to hold the prime key, and
      make the data communication portion transmit to the first image forming apparatus that currently holds the prime key an instruction to delete the prime key held there.

4. The information processing apparatus of claim 1, wherein
   the data communication portion is operable to acquire from the second image forming apparatus that has submitted the activation request a serial number of the second image forming apparatus, and
   the control portion is operable to generate, by using the acquired serial number and according to a previously set calculation formula, the activation key for use on the second image forming apparatus that has submitted the activation request.

5. The information processing apparatus of claim 1, wherein
   the control portion is operable to generate no activation key for another image forming apparatus based on the activation key for the second image forming apparatus.

6. An image forming system comprising:
   the information processing apparatus of claim 1;
   a first image forming apparatus
      that is an image forming apparatus within a local network to which the information processing apparatus belongs and
      that holds a prime key received from an external authentic activation key issuing system; and
   a second image forming apparatus
      that is an image forming apparatus within the local network to which the information processing apparatus belongs and
      that has installed thereon an application which has not yet been activated.

7. A method for controlling an information processing apparatus, comprising:
   communicating with
      a first image forming apparatus
         that is an image forming apparatus within a local network to which the information processing apparatus belongs and that holds a prime key issued by an external authentic activation key issuing system and
a second image forming apparatus
that is an image forming apparatus within the local network to which the information processing apparatus belongs and
that has installed thereon an application which has not yet been activated;
storing a key generation program for issuing an activation key based on the prime key; and
acquiring the prime key from the first image forming apparatus when the data communication portion receives from the second image forming apparatus an activation request requesting issuance of the activation key;
checking, based on a signature that is included in the acquired prime key and that indicates that the key has been generated authentically, whether or not the acquired prime key is an authentic key provided from the activation key issuing system, and if so,
generating, based on the acquired prime key and the key generation program, the activation key for use on the second image forming apparatus that has submitted the activation request, the activation key being a file containing the key itself, a date and time of generation thereof, data indicating that the activation key was generated by the information processing apparatus, and data indicating the information processing apparatus that generated the activation key;
transmitting the generated activation key to the second image forming apparatus that has submitted the activation request, and,
on generating the activation key based on the prime key and the key generation program, either or both
storing an application of which protection is to be cancelled, the image forming apparatus for which the activation key was issued based on the prime key, and a fee-charging record including a date and time of issuance of the activation key, and/or
transmitting the fee-charging record to a previously set address.

* * * * *